(12) United States Patent
Trowbridge

(10) Patent No.: US 6,345,813 B1
(45) Date of Patent: Feb. 12, 2002

(54) AIR SPRING

(75) Inventor: Mark Guy Trowbridge, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/928,100

(22) Filed: Aug. 10, 2001

(51) Int. Cl.[7] .................................................. F16F 9/04
(52) U.S. Cl. ................................. 267/64.27; 267/64.24
(58) Field of Search ........................... 267/64.19–64.27

(56) References Cited

U.S. PATENT DOCUMENTS

| | | | | |
|---|---|---|---|---|
| 2,999,681 A | * | 9/1961 | Muller et al. | 267/64.27 |
| 3,043,582 A | * | 7/1962 | Hirtreiter | 267/64.27 |
| 3,084,952 A | * | 4/1963 | Freitas et al. | 267/124.162 |
| 4,650,166 A | * | 3/1987 | Warmuth | 267/64.27 |
| 4,690,388 A | * | 9/1987 | Harrison | 267/35 |
| 4,763,883 A | * | 8/1988 | Crabtree | 267/64.27 |
| 4,787,606 A | * | 11/1988 | Geno et al. | 267/64.27 |
| 4,787,607 A | * | 11/1988 | Geno et al. | 267/64.27 |
| 4,934,667 A | * | 6/1990 | Pees et al. | 267/64.21 |
| 5,364,086 A | * | 11/1994 | Paton | 267/140.4 |
| 5,859,692 A | * | 1/1999 | Ross, Jr. et al. | 267/64.19 |
| 5,954,316 A | * | 9/1999 | Voss | 267/64.27 |

OTHER PUBLICATIONS

Drawing 79–92–2–530; Goodyear Airspring.*

* cited by examiner

Primary Examiner—Christopher P. Schwartz
(74) Attorney, Agent, or Firm—Nancy T. Krawczyk

(57) ABSTRACT

An air spring wherein the spring constant of the air spring can be readily tuned to achieve a desired ride performance is disclosed. The air spring has a cylindrical elastomeric sleeve, bead plates, and support rings. The sleeve is secured at each end to a bead plate. The support rings are secured to the bead beads, extending radially outward from the bead plates. The support rings have an inner shoulder, an outer shoulder, and a tracking surface extending between the shoulders. When the air spring is at design height, the sleeve contacts only the inner shoulders of the support rings. By limiting the initial contact of the sleeve with ring and determining where this contact occurs, the movement of the sleeve during jounce can be modified, altering the effective area rate of change.

9 Claims, 4 Drawing Sheets

AIR SPRING

FIELD OF THE INVENTION

The present invention is directed to an air spring. More specifically, the air spring is a piston-less air spring designed to achieve a desired spring constant.

BACKGROUND OF THE INVENTION

Air springs have been used for motor vehicles and various machines and other equipment for a number of years. The springs are designed to support a suspension load such as a vehicle. The air spring usually consists of a flexible elastomeric reinforced sleeve that extends between a pair of end members. The sleeve is attached to end members to form a pressurized chamber therein. The end members mount the air spring on spaced components or parts of the vehicle or equipment on which the air spring is to be mounted. The internal pressurized gas, usually air, absorbs most of the motion impressed upon or experienced by one of the spaced end members. The end members move inwards and towards each other when the spring is in jounce and away and outwards from each other when the spring is in rebound. The design height of the air spring is a nominal position of the spring when the spring is in neither jounce or rebound.

There have been two basic designs of air springs: a rolling lobe air spring, as seen in U.S. Pat. Nos. 3,043,582 and 5,954,316, and a bellows type air spring, as seen in U.S. Pat. Nos. 2,999,681 and 3,084,952. In a rolling lobe type air spring, the airsleeve is a single circular shaped sleeve secured at both ends. During jounce, the airsleeve rolls down the sides of a piston support. In a bellows type air spring, the multiple meniscus shaped portions of the air sleeve extend out radially as the spring is in jounce.

For every air spring, the spring rate is an indicator of the characteristics of the air spring. The spring rate k may be determined by the following known equation:

$$k = ((n*Pa*(Ae)^2)/V) + (Pg*(dAe/dx))$$

where
  n=gas constant, typically 1.38,
  Pa=absolute pressure,
  Ae=effective area,
  V=internal volume,
  Pg=gage pressure,
  x=height of air spring,
  dAe/dx=Effective Area Rate of Change.
The effective area Ae, is determined by:

$$Ae = Fs/Pg$$

where
  Fs=spring force.

For a given application, there is a specified operating pressure and target load, so the effective area for the spring is fixed.

In most applications, it is desired that the spring constant k be relatively small. In other applications, it may be desired that the spring constant be variable depending upon the operating conditions of the vehicle. For example, when encountering uneven road surfaces, if only one axle at a time responds to the uneven surface, then it is desired to have a lower spring constant. However, if multiple axles are simultaneously responding to the uneven surface, it is desired to have a higher spring constant.

SUMMARY OF THE INVENTION

The present invention is directed to an air spring wherein the spring constant of the air spring can be readily tuned to achieve a desired ride performance. Specifically, the inventive air spring has a cylindrical elastomeric sleeve, bead plates, and support rings. The sleeve is secured at each end to a bead plate. The support rings are secured to the bead beads, extending radially outward from the bead plates. The support rings have an inner shoulder, an outer shoulder, and a tracking surface extending between the shoulders. When the air spring is at design height, the sleeve contacts only the inner shoulders of the support rings.

By limiting the initial contact of the sleeve with the ring and determining where this contact occurs, the movement of the sleeve during jounce can be modified, altering the effective area rate of change.

In another aspect of the invention, the air spring and the rings may also be defined by the relationship of the sleeve hinge point and the relative location of the ring inner shoulders. Each sleeve end has a hinge point about which the sleeve moves during operation of the air spring. The hinge point at each sleeve end is axially outward from the adjacent support ring inner shoulder relative to the axial cross sectional line AL located at the maximum diameter of the sleeve when the air spring is at design height.

In another aspect of the invention, the air spring and rings may also be defined by the relationship of the maximum diameters of the sleeve and the rings at design height. At design height, the diameter of the support rings at the outer shoulder is greater than the maximum diameter of the sleeve.

The support rings may have a variety of configurations. The support ring may have a solid structure or may have a trough type configuration for reduced weight. The rings may be formed out of metals or thermoplastics or thermoresins. The rings may have a plurality of corrugated ribs to provide strength to the ring. The ring may have either an extending toe or an extending tab for fitment with the related bead rings. The ring may have any radially outwardly extending tab to assist the air spring in balance when the air spring is mounted. When the rings are employed with an air spring, the top and the bottom rings may have identical or differing configurations depending upon the desired air spring performance characteristics.

BRIEF DESCRIPTION OF THE DRAWINGS

The invention will be described by way of example and with reference to the accompanying drawings in which.

DETAILED DESCRIPTION OF THE INVENTION

For the present invention, it was desired to form an air spring with a larger than conventional spring rate k. In accordance with the equation for determining the spring rate k for a determined application, the only variables which may be manipulated to increase the spring constant k are the internal volume V, which may be decreased to increase the spring constant, and the effective area rate of change dAe/dx, which may be increased to increase the spring constant. The inventor of the present invention found that decreasing the internal volume of the air spring was an ineffective solution due to an increased weight of volume minimizers and jounce height interference problems such minimizers created. The inventor found that the effective area rate of change can be manipulated to produce an air spring with a relatively large spring constant k.

Figure 1:
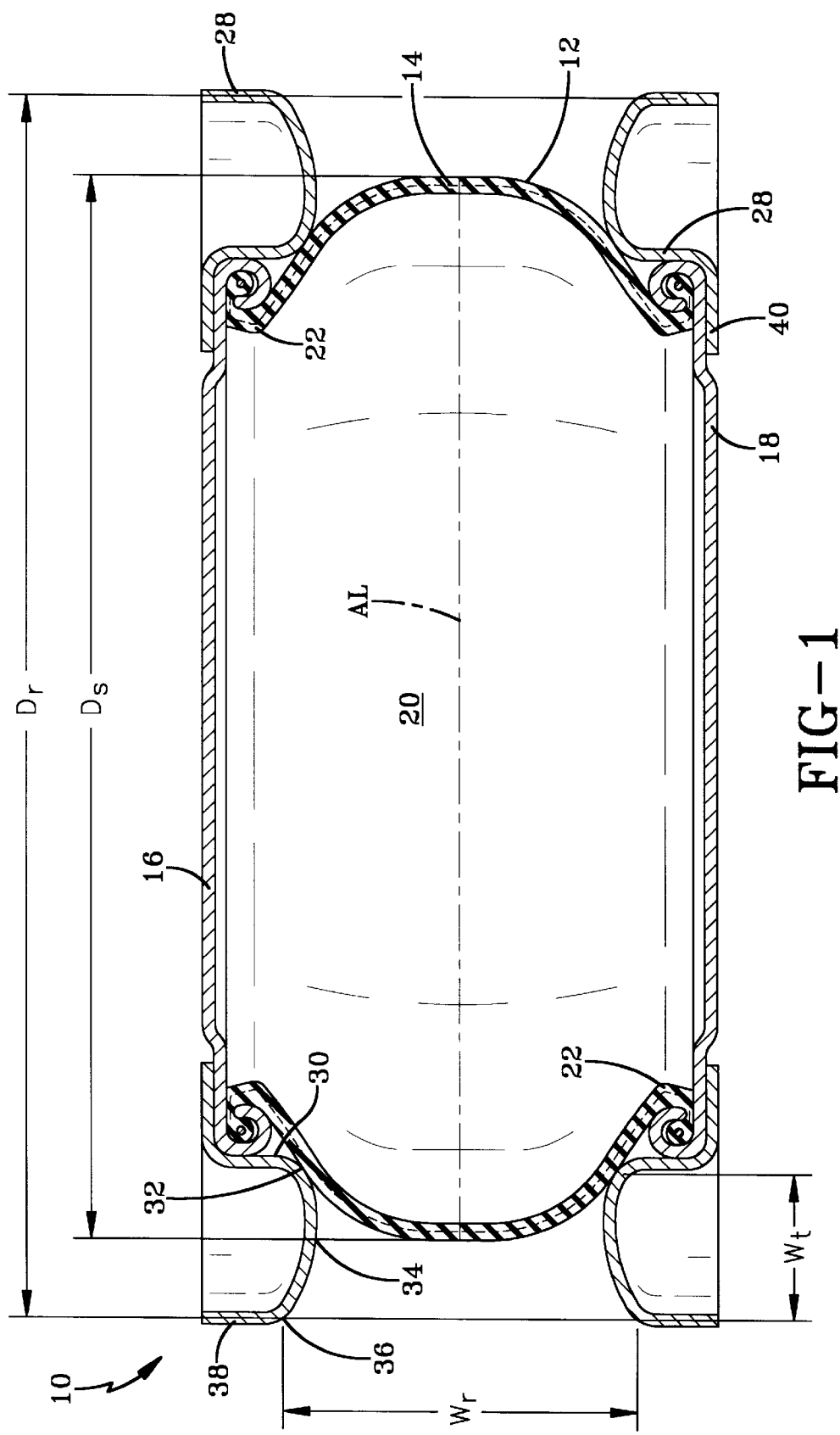
FIG. 1 is a cross-sectional view of an air spring in accordance with the present invention.

The present invention is a rolling lobe type air spring designed to provide a relatively large spring constant. By way of example, and not limiting the different features of the present invention, FIG. 1 is a cross sectional view of an air spring 10 at design height in accordance with the present invention.

The air spring 10 has a rolling lobe cylindrical elastomeric airsleeve 12. The airsleeve 12 is typically constructed from at least one layer of rubberized reinforcing cord 14. The airsleeve 12 is secured at one end to the upper bead plate 16 and at the second end to a lower bead plate 18, forming a pressurized chamber 20. The ends of the airsleeve 12 are crimped about the circumferential edges of the bead plates 16, 18. Alternatively, at the ends of the airsleeve 12 may be secured by a crimping ring and crimping retainer plate, which are conventional in the art. The crimping of the ends of the airsleeve 12 creates a hinge point 22 about which the airsleeve 12 flexes when the air spring 10 is in rebound and jounce. The air spring 10 may also be provided with conventional elements such as an internal bumper 24 and air valves 26, see FIG. 2.

For reinforcement of the airsleeve 12, at least one layer of reinforcement 14 may be provided within the sleeve 12. The reinforcement layer 14 is formed of conventional cords such as polyester, nylon, aramid, glass, or steel; the chosen reinforcement material is determined by the forces to which the air spring 10 will be subject upon use. The length and diameter of the sleeve 12, and thus the overall size of the air spring 10, varies depending upon the end use of the air spring 10. The sleeve 12 is not girdled as with a bellows type air spring, so that the sleeve 12 may move in the manner to be discussed below.

Mounted about the upper and the lower bead plates 16, 18 are support rings 28. The support rings 28 are circular and extend about the full circumference of the bead plates 16, 18. The rings 28 have a contact surface. The contact surface is defined by an inner sidewall 30, an inner shoulder 32, a tracking surface 34, an outer shoulder 36, and an outer sidewall 38. Each shoulder 32, 36 is located where the direction plane of the surface changes. The tracking surface 34 extends between the inner shoulder 32 and the outer shoulder 36 and has a width Wt.

The tracking surface width Wt is such that the tracking surface 34 extends radially at least to the maximum width Ds of the airsleeve 12. The overall diameter Dr of the bead ring 28 is at least equal to or greater than the maximum diameter Ds of the airsleeve 12 when the air spring 10 is at the design height. Additionally, at design height, the axial distance Wr between the tracking surfaces of the opposing rings 28, as measured at the outer shoulders 36, is at least equal to the tracking surface width Wt.

The height of at least the inner sidewall 30, as measured from the base of the ring 28 to the inner shoulder 32, is such that the hinge point 22 of the airsleeve 12 is axially outward from the inner shoulder 32 relative to the axial cross sectional line AL located at the maximum diameter Ds of the mounted airsleeve 12. Because of the relative position of the ring inner shoulder 32 and the sleeve hinge point 22, when the air spring 10 is at design height, as seen in FIG. 1, the airsleeve 12 contacts only the inner shoulder 32 of the support ring 28 and does not lie upon the tracking surface 34.

Figure 2:
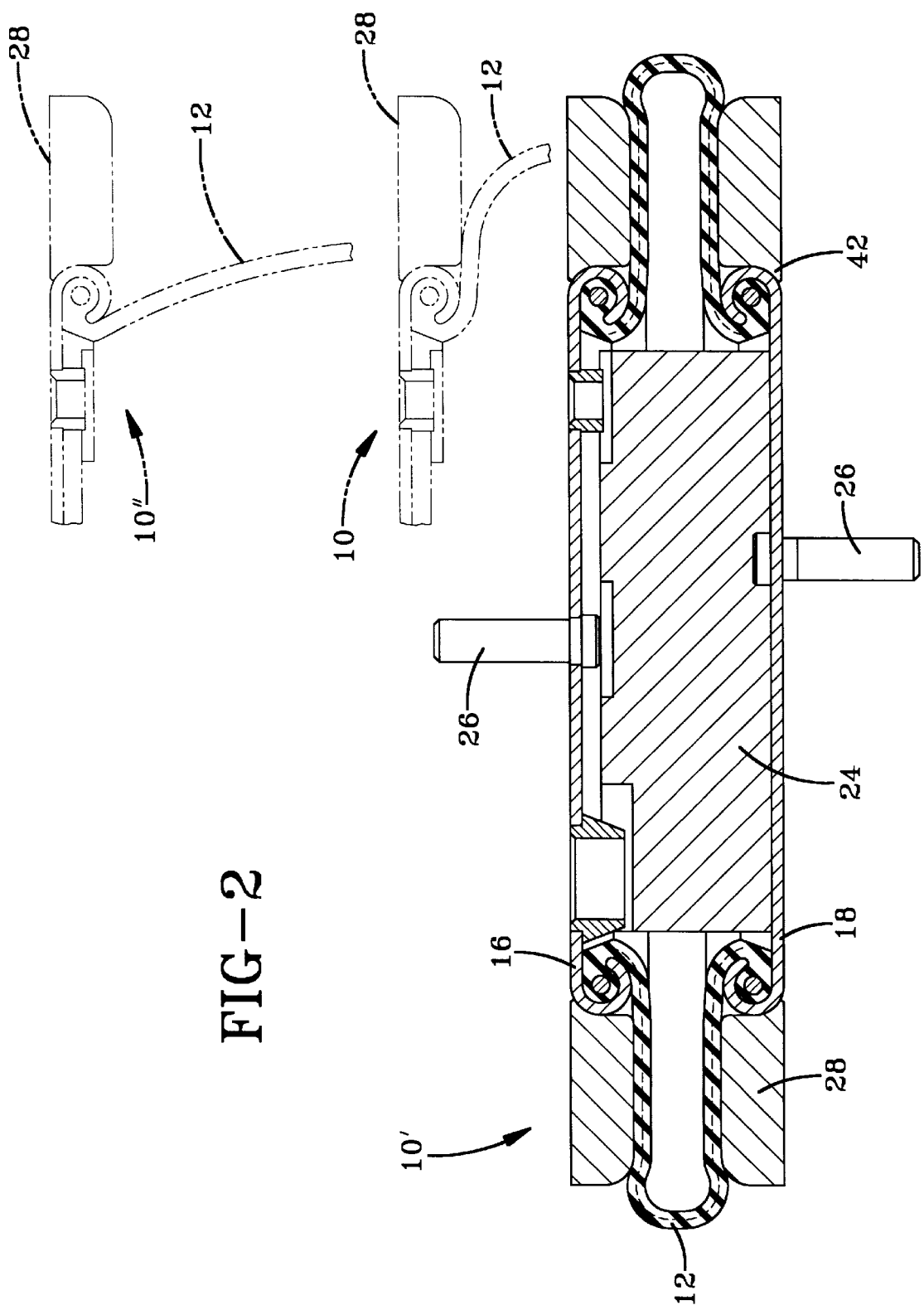
FIG. 2 is a cross-sectional view of an air spring in jounce, and showing the airspring at design height and in full rebound.

FIG. 2 illustrates the air spring 10' in jounce position. For comparison, it also shows the air spring 10 at design height and the air spring 10" at full rebound position.

When the air spring 10' is compressed, as the airsleeve 12 is already contacting the support ring 28, the airsleeve 12 increases contact with the tracking surface 34, see FIG. 2, and the effective maximum diameter of the sleeve 12 rapidly increases. The ratio of the ring diameter Dr to the design height maximum sleeve diameter Ds, and the ratio of the design height ring separation distance Wr to the tracking surface width Wt are optimized so that as jounce begins, the sleeve 12 is rapidly pushed radially outward. Thus, as the sleeve diameter increases, the effective area of the spring 10 rapidly changes. The change in effective area is greater than the change in the spring height. Thus, the effective area rate of change increases, increasing the value of the spring constant k. By crafting the contour of the tracking surface 34, the rate of change in effective area can be "tuned" to meet any desired performance characteristics, and other exemplary contours are shown in FIGS. 3–6. Preferably, the ratio Dr/Ds is at least 1.0, and the ratio Wr/Wt is not greater than 2.0.

As compression of the airspring 10 continues, the effective area rate of change stabilizes. However, by that time this point is reached by the air spring 10', the volume of the airsleeve 12 is sufficiently reduced that the spring rate k remains high.

At close to full jounce, when the air spring 10' is at its most compressed position, the airsleeve 12 begins to contact the outer shoulder 36 and the sleeve 12 begins to roll down the outer sidewalls 38. As the sleeve 12 begins to roll down the sidewalls 38, the rate of increase of the internal pressure of the air spring 10' is reduced. At this point the ratio of the ring diameter Dr to the jounce height maximum sleeve diameter is less than 1.0, and preferably less than 0.98.

The ring 28 may have a variety of configurations and may be formed from different materials, so long as the ring 28 has a contact surface with an inner shoulder, tracking surface, and outer shoulder upon which the airsleeve 12 travels during jounce.

The rings 28 of FIG. 1 have an open trough configuration. The rings have a radially inner extending flange 40 for mounting the rings 28 onto the bead plates 16, 18. The rings 28 of FIG. 2 have a solid construction with a contact surface substantially similar to the rings 28 of FIG. 1. The rings 28 have a small radially inner lip 42 so that the rings 28 rest on the outer surfaces of the bead plates 16, 18 when mounted.

Figure 3:
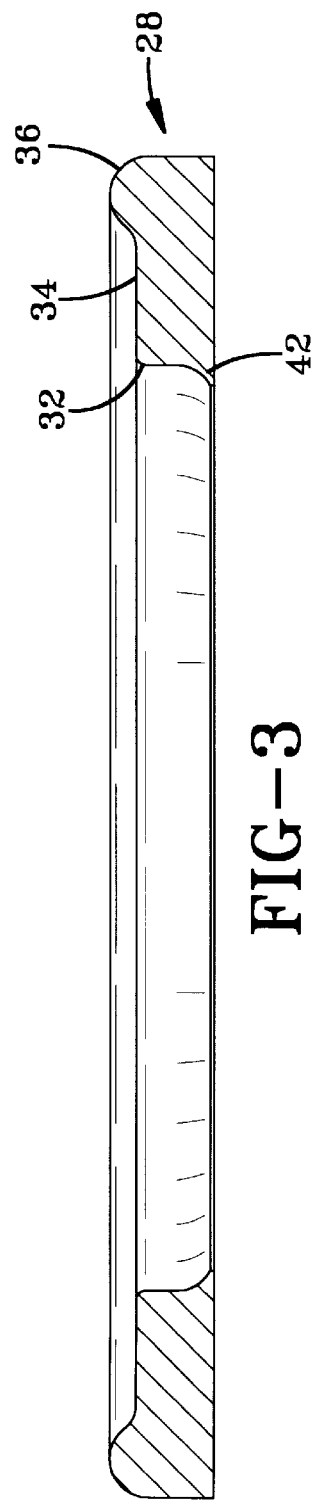
FIGS. 3, 4, 5, 6, and 6A are alternative embodiments of the support ring.

The contact surface of the ring 28 of FIG. 3 has a multiple contour configuration. This ring 28 is also illustrated as solid, but may be formed as an open trough, similar to the ring of FIG. 1 to reduce the weight of the ring 28. The radially innermost point of the ring 28 is a small lip 42 for retention on the bead plates 16, 18.

Figure 4:
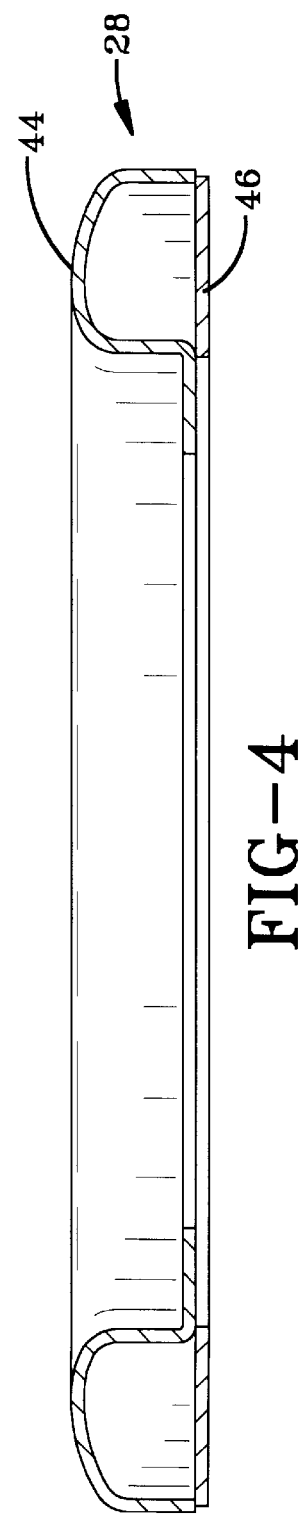

The ring 28 of FIG. 4 is formed by two stamped metal pieces 44, 46. The piece 44 forming the contact surface is similar to the ring 28 of FIG. 1. The second piece 46 is secured to the open trough of the first piece 44 to result in a more structurally stable ring 28.

Figure 5:
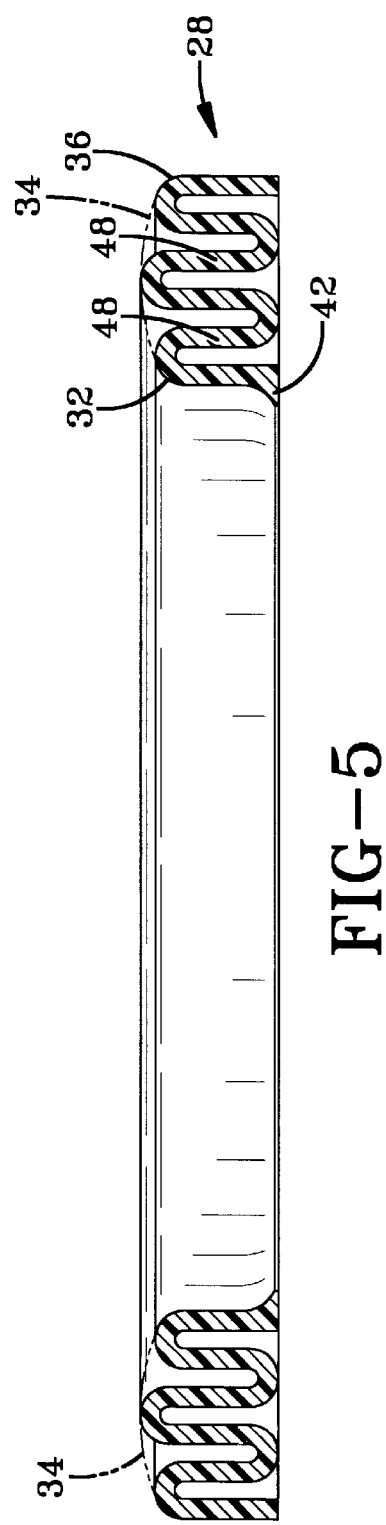

The ring 28 of FIG. 5 is formed of conventional thermoplastic or thermoset materials of the type used to manufacture airspring pistons. To obtain the necessary structural stability needed, the ring 28 is formed as a series of accordion ribs 48. The outer surface of the ring 28 approximates the contact surface of the other exemplary rings 28 and enables the airsleeve 10 to move in the desired manner.

Figure 6:
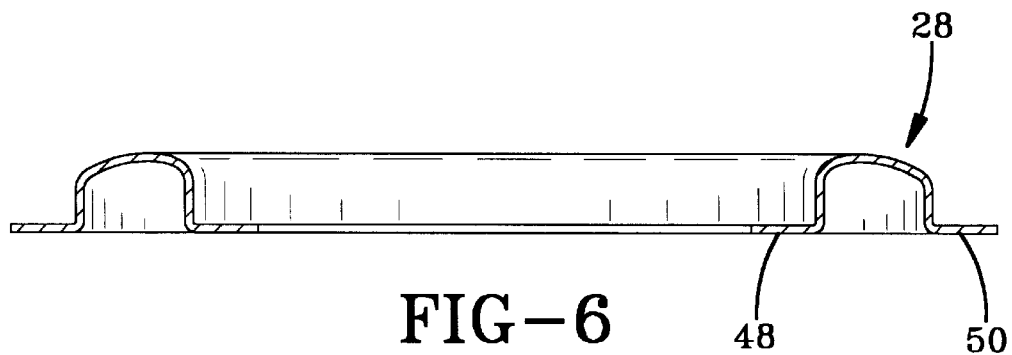
Figure 6A:
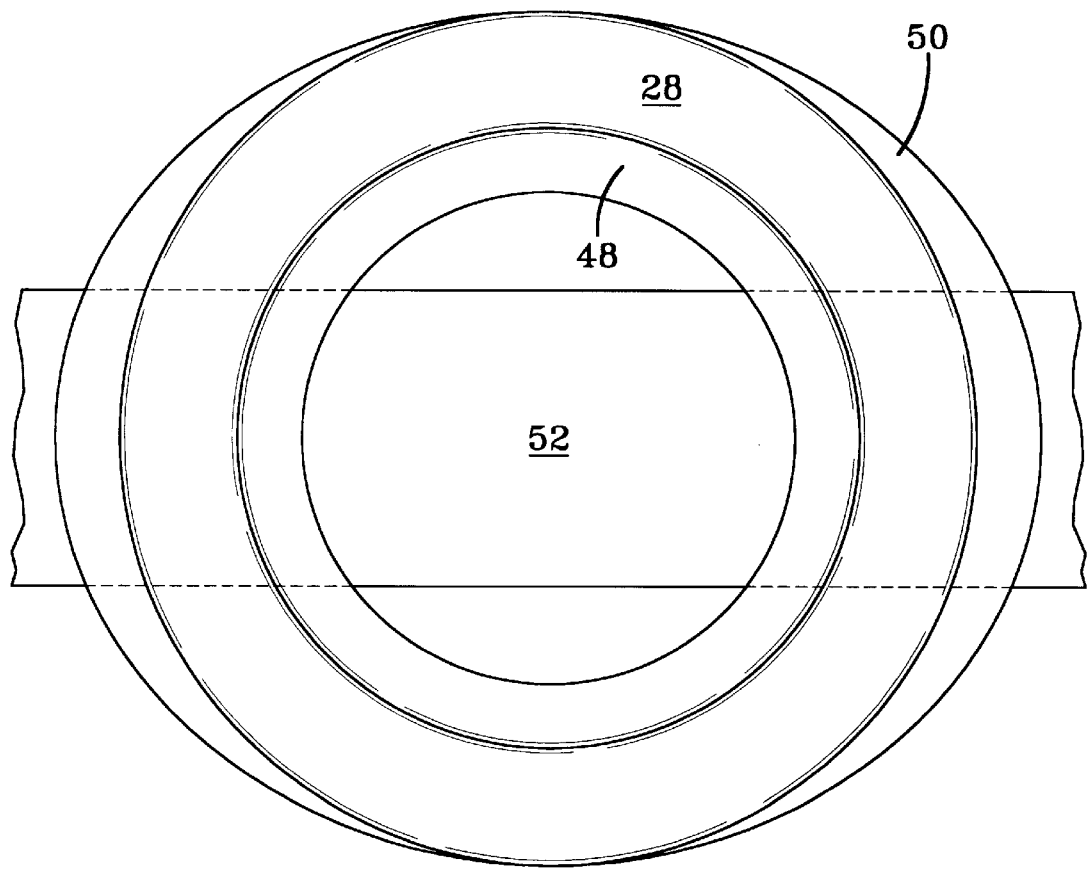

FIGS. 6 and 6A illustrate another variation of the stamped metal ring 28. The ring 28 has both a radially inner extending flange 40 and a radially outer extending flange 50. The outer extending flange 50 may be continuous about the outer circumference of the ring 28, or the width of the flange 50 may vary. When the air spring 10 is to be mounted on a narrow surface such as a beam 52, the edges of the air spring 10 overhang the beam 52. To provide additional reinforcement, the flange width is increased to a maximum width at two opposite locations that then contact the beam 52 when the air spring 10 is mounted.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An air spring comprising a cylindrical elastomeric sleeve, bead plates, and support rings, wherein the sleeve is secured at each end to a bead plate, and a support ring is secured to an outer surface of each bead plate, and the support rings have an inner shoulder, an outer shoulder, and a tracking surface extending between the shoulders, and when the air spring is at design height, the sleeve contacts only the inner shoulders of the support rings.

2. An air spring in accordance with claim 1 wherein each sleeve end has a hinge point about which the sleeve moves during operation of the air spring and the hinge point at each sleeve end is axially outward from the adjacent support ring inner shoulder relative to the axial cross sectional line AL located at the maximum diameter of the sleeve when the air spring is at design height.

3. An air spring in accordance with claim 1 wherein the diameter of the support rings at the outer shoulder is greater than the maximum diameter of the sleeve when the air spring is at design height.

4. An air spring in accordance with claim 1 wherein the ratio of the axial distance Wr between the rings, at the outer shoulder, to the width of the tracking surface is not greater than 2.0.

5. An air spring in accordance with claim 1 wherein at least one support ring has a trough configuration.

6. An air spring in accordance with claim 1 wherein at least one support ring has a plurality of corrugated ribs.

7. An air spring in accordance with claim 1 wherein at least one support ring has a radially inwardly extending tab.

8. An air spring in accordance with claim 1 wherein at least one support ring has a radially outwardly extending tab.

9. An air spring in accordance with claim 8 wherein the width of the extending tab varies about the circumference of the ring.

* * * * *